June 26, 1945.  M. M. SAFFORD  2,379,318
HIGH FREQUENCY TRANSMISSION LINE
Filed July 22, 1942  2 Sheets-Sheet 1

LOSS MEASUREMENTS AT 300 MEGACYCLES

Inventor:
Moyer M. Safford,
by Harry E. Dunham
His Attorney.

June 26, 1945.    M. M. SAFFORD    2,379,318
HIGH FREQUENCY TRANSMISSION LINE
Filed July 22, 1942    2 Sheets-Sheet 2

Inventor:
Moyer M. Safford,
by Harry E. Dunham
His Attorney.

Patented June 26, 1945

2,379,318

UNITED STATES PATENT OFFICE 2,379,318

HIGH-FREQUENCY TRANSMISSION LINE

Moyer M. Safford, Schenectady, N. Y., assignor to General Electric Company, a corporation of New York Application July 22, 1942, Serial No. 451,821

13 Claims. (Cl. 174—107)

My invention relates to high frequency transmission lines, and more particularly to flexible transmission lines for ultra high frequency currents.

This application is a continuation-in-part of my copending application, S. N. 433,571, filed March 6, 1942, for High frequency transmission line, which is assigned to the same assignee as the present application. It is a particular object of my present invention to provide a new and improved form of the transmission line described and claimed in my copending application.

It is a further object of my invention to provide a new and improved high frequency transmission line of the type described in that copending application, in which the dielectric filler of the transmission line is exceptionally resistant to dislocation of the concentric conductors of the transmission line, even at high temperatures, and is yet highly flexible at low temperatures.

Figure 1:
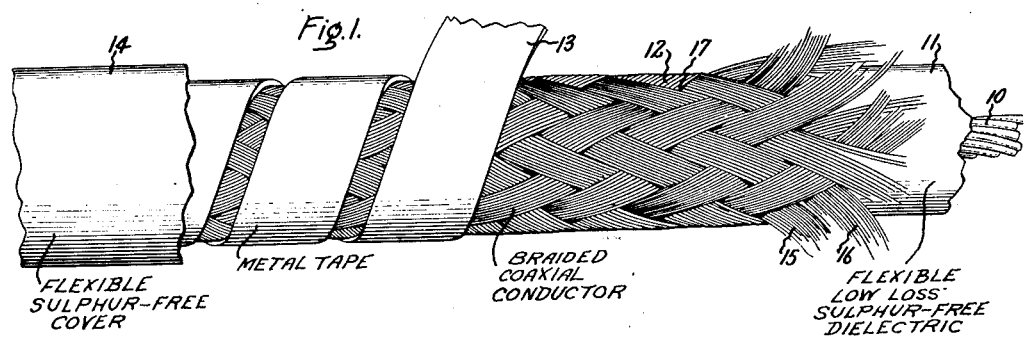
Figure 2:
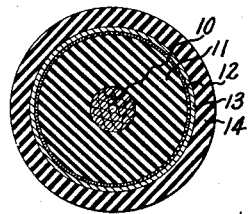
Figure 3:
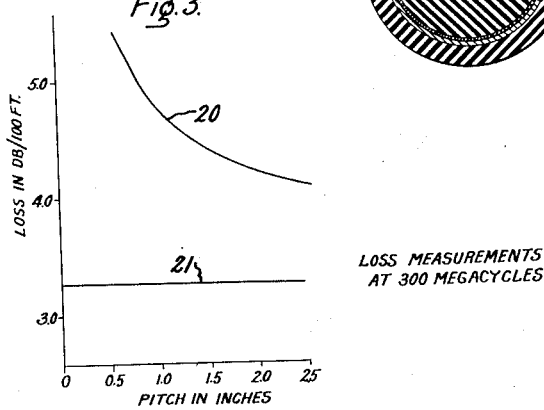
Figure 4:
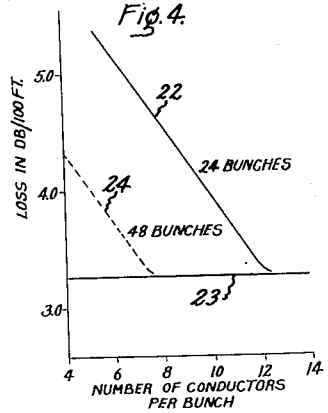
Figure 5:
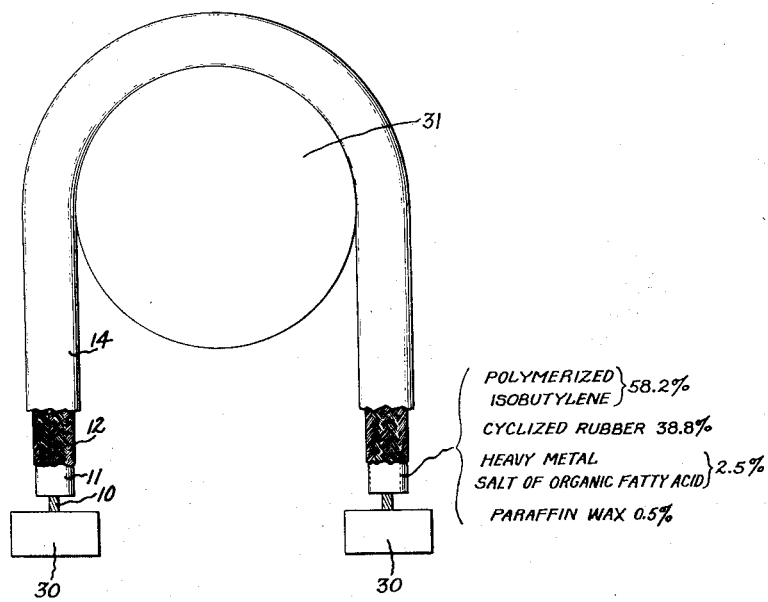

The features of my invention which I believe to be novel are set forth with particularity in the appended claims. My invention itself, both as to its organization and manner of operation, together with further objects and advantages thereof may best be understood by reference to the following description taken in connection with the accompanying drawings in which Fig. 1 is a side view of a cable, partly broken away, embodying my invention; Fig. 2 is a cross section of the cable of Fig. 1; Figs. 3 and 4 show curves expressing certain characteristics of the cable of Figs. 1 and 2; and Fig. 5 illustrates a cable similar to that of Fig. 1 undergoing tests.

In Fig. 1 a central conductor 10 is covered in turn with a flexible, low loss, sulphur-free dielectric 11, a flexible cylindrical conducting braid 12, an armoring strip 13 wound spirally around braid 12, and a flexible, sulphur-freee compound covering 14 for the exterior of the cable.

The central conductor 10, as may be seen more clearly in Fig. 2 in which the same reference numerals are applied to the same elements, is made generally cylindrical in shape. It may be a single cylindrical conductor, or if desired a plurality of individual conductors formed in cylindrical shape, as illustrated. It is preferred, where maximum flexibility is desired, that the central conductor 10 be formed of a plurality of small conductors, as illustrated.

Although the loss in the central conductor 10 is minimum when that central conductor is a solid cylindrical wire, the loss in a conductor 10 of spirally laid wires may be minimized, and may be made to approach the loss attained in a solid conductor, under certain conditions. In Fig. 3 the curve 20 represents the relation between the loss in decibels per hundred feet of a cable having a spirally laid central conductor 10, plotted as ordinates, with the pitch of the individual conductors in the central conductor 10, plotted as abscissa. The curve 21 in Fig. 3 represents the losses in decibels per hundred feet of a cable identical in all respects with that represented by the curve 20, except that the central conductor 10 is a solid cylindrical copper wire. It is evident that the losses in a cable having a stranded, spirally laid central conductor 10, in which the losses are represented by the curve 20, are reduced as the individual conductors in the stranded central conductor 10 are made more nearly parallel to the axis of the cable, the losses in the cable with the stranded conductor approaching as a limit the losses in a conductor with a solid central conductor 10.

It is desirable that the individual conductors in the stranded central conductor 10 be laid spirally in order that the conductor 10 shall be flexible, but as is evident from the above discussed curve 20, each individual wire in the conductor 10 which is spiraled around the axis of the cable should be spiraled a minimum number of times per unit length of the cable, and not more than once in about two or three inches for a cable whose dimensions and impedance are the same as that for which the losses are indicated in Fig. 3.

The material of which the insulating dielectric 11 is formed must be, as stated above, flexible, low loss, and sulphur-free. This material should, of course, have sufficient insulating value to withstand voltages impressed between the central conductor 10 and the braid 12. As a delectric, it should introduce a minimum loss in the transmission line at the ultra high frequencies of the current transmitted therethrough, for example, at frequencies in the order of 50 to 3000 megacycles. It is of great importance that the dielectric material 11 be sulphur-free, in order that a highly conducting metal, such as copper, may be used for the central conductor 10 and for the braid 12. If the material of the dielectric 11 were not sulphur-free, some protective coating would have to be applied to the central conductor 10 and to the individual conductors of the braid 12, thereby increasing the resistance loss in these conductors, especially by reason of the skin effect, which is pronounced at ultra high frequencies.

Following are given several examples of compounds which may be used for the dielectric 11:

(1) Polymerized ethylene (polythene).

(2) Polymerized ethylene and from 10 to 40% of polymerized isobutylene (polybutene).

(3) Polystyrene, 10 to 75% of polybutene, 5 to 45% of a special whiting, and up to 15% paraffin.

(4) Polybutene and 5 to 40% of a high melting point wax, for example, anthracene.

(5) Polybutene and 5 to 50% of a copolymer of a diolefine and styrene.

(6) Polybutene and 10 to 40% of a deproteinized rubber vulcanized with non-sulphur bearing material.

It is preferred to use a compound for the dielectric material 11 which is relatively resistant to flow and distortion up to 80° C. and shall remain flexible as low as −40°.

The cylindrically braided coaxial conductor 12 is so formed as to introduce minimum inductance and minimum loss in its length. The braid 12 is formed by interweaving cylindrically a number of bunches 15, 16, etc. of individual conductors. By the term "bunch," I mean a group of individual conductors which are laid as one element of a braid, all such conductors in one bunch on a cable being laid flat, side by side, and substantially parallel to each other. The number of these bunches used in forming the braid 12, the number of conductors in each bunch, and the size of each conductor are factors interrelated for two simultaneous purposes. They are so interrelated as to make it possible to form the braid 12 tightly about the dielectric medium 11 with each pair of adjacent bunches so closely together that substantially no electrically effective apertures remain at intersections between bunches, as at 17, and simultaneously so that each individual conductor in the braid is wound around the dielectric 11 a minimum number of times per unit length of the transmission line.

The characteristic, or surge, impedance of the resulting cable depends on the outer diameter of the central conductor 10, the inner diameter of the braid 12, and the dielectric constant of the dielectric 11. It is possible, by proper choice of these dimensions, to design a cable with any desired characteristic impedance.

As an example of one particular cable structure having such a braid, which cable has been found quite satisfactory, the following specifications are given. The central conductor 10 was formed of seven copper conductors, each of 28.5 mils diameter. The dielectric 11 was extended around the central conductor 10, and its outside diameter was made 285±5 mils. The braid 12 was formed tightly around the dielectric 11 and included twenty-four bunches, each bunch having ten individual copper conductors, each of 7.5 mils diameter. The material of the dielectric 11 was that listed as (5) above. The resulting characteristic impedance of the cable was 50±2 ohms.

In this particular cable there were about eight picks, or cross-overs, per linear inch along the cable. That is, measuring in a line parallel to the center conductor for one inch, about eight bunches of ten conductors each are crossed. It has been found that, with a cable of any particular diameter, there is a minimum number of picks, or cross-overs, per inch desirable in the braid. If the braid has a number of picks, or cross-overs, per inch equal to, or less than, this critical value, it is substantially equivalent to a solid copper sheet.

This characteristic of the braid is shown in Fig. 4 for cables of one particular diameter. The curve 22 represents the relation between the power loss in decibels per hundred feet of cable at 300 mc., plotted as ordinates, and the number of conductors per bunch, plotted as abscissae, where the braid in the cable has twenty-four bunches of conductors. The curve 23 represents the power loss in decibels per hundred feet for an identical cable in which the braid is replaced by a solid copper tube. As indicated by the curve 22, the losses decrease rapidly for a cable of a particular diameter, in which the braid has a certain number of bunches of individual conductors, as the number of conductors per bunch is increased, up to a critical value. In this case, for the curve 22, when there are twelve conductors per bunch, the loss in the cable is substantially the same as if a solid copper sheet were used in place of the braid. No substantial decrease in loss is attained if the number of conductors per bunch is increased beyond this critical value.

For cables of different diameter, relations similar to that of Fig. 4 apply, but the losses are lower for larger cable and higher for smaller cable than the curve indicates. In any case there is a determinable minimum number of conductors per bunch which makes the braid electrically equivalent, so far as power loss is concerned, to a solid copper tube.

Expressed otherwise, the conductors of the braid must be as nearly parallel to the cable axis as possible, always maintaining the braid free of electrically effective apertures, and tightly placed around the dielectric.

The braid for any particular cable of predetermined diameter may be made of a few large individual conductors, or of many small individual conductors. The choice of the number of bunches in the braid, and the number and size of conductors in each bunch, is made so that the braid shall cover the dielectric 11 tightly and have substantially no electrically effective apertures therethrough.

The choice of the number of bunches usually depends on the braiding machines available, and the choice of the size and number of conductors in each bunch may be made, knowing the number of bunches to make the braid conform to the requirement that it shall have substantially as many conductors per bunch as the critical value at which the braid is the electrical equivalent of a solid conducting tube.

When larger cables are desired, the number of bunches of individual conductors in the braid may be increased, as, for example, to forty-eight bunches. The curve 24 in Fig. 4, for a cable having forty-eight bunches of conductors in its braid, is generally similar in shape to the curve 22, and indicates that there is again a critical minimum number of conductors per bunch in the braid to make that braid the electrical equivalent of the solid copper sheet. In the curve 24 as shown, about seven conductors per bunch would be effective to make the braid the electrical equivalent of a solid copper sheet.

The copper tape 13 need not be used, unless desired. It may be found useful in some cases in providing mechanical protection for the braid and to resist collapse of the cable under pressure.

The outer covering 14 must, of course, be flexible and must be sulphur-free for the same reason as the dielectric 11. That is, the covering 14 must not be of such composition as to react with the copper of the conductors in the braid 12 so as to increase the attenuation of the cable. Such compounds as the following may be used for the covering 14:

(1) Plasticized polyvinyl chloride.

(2) Plasticized copolymer chloride and about 5% of polyvinyl acetate. (Vinylite)

(3) Methyl or ethyl acrylate and 5–50% of a regular rubber type filler. This compound being made tough and extrudable.

It is highly desirable in many situations, where the cable is exposed to oil that the covering be an oil resistant material. It is also desirable that the cover be able to stand temperature variations as well as the dielectric 11, without loss of flexibility.

The low power loss of cable constructed as described above is not brought about by independent improvement of the dielectric or of the braid, but is due to the simultaneous improvement of both, and the resulting cooperation between them. The loss is, indeed, reduced in the braid 12 by my novel construction, being a minimum when the number of conductors per bunch is at or above a critical value. However, overall improvement can only be obtained where the composition of the dielectric material 11 is such that the improved characteristics of the braid 12 can be taken advantage of and are not destroyed by corrosion of the braid by reaction with the dielectric material. That is, the dielectric material 11 must be sulphur-free in order that copper, or other highly conducting metal, may be used in the construction of the braid 12 to reduce its losses. Further, if the losses in the dielectric material 11 be much higher than in the braid 12, or if the losses in the braid 12 be much higher than in the dielectric material 11, improvement in the part of the cable with the lower loss is of little effect in improving the cable as a whole.

In one particular case, in which a cable was constructed as described above, using the dielectric material 11 listed above as (3), it was found that the losses at 300 megacycles were 3.8 decibels per hundred feet. The best previously obtainable cable had losses of about 5.8 decibels. In other words, it transmitted only about two-thirds as much power through a hundred feet of cable as my improved low loss cable.

While the several above-described examples of compounds which may be used for the dielectric 11 are satisfactory, it has been found that the following compound possesses exceptional qualities and is preferred over the other compounds:

|   | Per cent |
|---|---|
| Polybutene (polymerized isobutylene), known as "Vistanex B-100" | 58.2 |
| Cyclized rubber, known as "Marbon B" (high softening point type) | 38.8 |
| Zinc stearate powder | 2.5 |
| Paraffin wax | 0.5 |

The extruding operation of this compound in the formation of the cable takes place at approximately 120° to 130° centigrade, at which temperatures the zinc stearate is a good lubricant and also acts as a mixing medium, providing good compatibility in the mixture of polybutene and cyclized rubber.

At operating temperatures, the zinc stearate is a solid, the compound remaining quite solid at temperatures as high as 75° centigrade.

The physical qualities of the compound are excellent, maintaining the concentric conductors of the cable in position even though the cable is flexed through extreme angles, and even under severe test.

One test imposed on a short length of such cable is illustrated in Fig. 5 and comprises the fastening of a 2 lb. weight 30 to each end of the inner conductor 10 of the short length of cable, and placing the assembly over a mandrel 31 of 4" diameter. The weights, cable, and mandrel are placed in an oven at 75° centigrade for 7 hours, at the end of which time the center conductor 10 does not cut through the insulating compound 11 to produce a short circuit with the outer conductor 12.

Zinc stearate in this compound does not reduce appreciably the flexibility of the cable at low temperatures.

Other heavy metal salts of organic fatty acids may be utilized in place of the zinc stearate as the lubricant in this compound, although the zinc stearate is preferred at the present time. Lead and cadmium are examples of other heavy metals used in these extrusion lubricants, and the fatty acid radicals may include palmitates and oleates as well as the stearates.

These heavy metal salts of organic fatty acids, used as extrusion lubricants in this cable filling compound, do not materially reduce the insulation properties or detract substantially from the good qualities of the polybutene and cyclized rubber as a dielectric medium. Zinc stearate has qualities which make the cable filling compound including it as extrusion lubricant especially useful. Such a filler compound has very low electrical losses and softens only at a high temperature much above 75° centigrade.

This cable filler compound which includes as an extrusion lubricant a heavy metal salt of an organic fatty acid is of especial use in a high frequency cable as previously described in which the outer conductor is formed as a braided coaxial conductor in the manner taught in this application. Losses in such a cable are greatly increased if the concentricity of the center and the outer cylindrical conductors 10 and 12 is disturbed for any reason, as by mechanical forces on the cable. The filler compound including polybutene, Marbon B, and zinc stearate is especially resistant to mechanical stress and the like, which might with other compounds disturb the concentricity of the inner conductor or the cylindrical form of the outer conductor of the cable herein described. It is only by a simultaneous reduction of all factors contributing to electrical loss in such a cable that the overall losses may be reduced, the resistance of this filler compound contributing to reduction of loss by preventing distortion of the cable with resulting electrical reflection in the cable.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In a high frequency transmission line, a central conductor, a cylindrical body formed of a sulphur-free compound comprising about 58 per cent polymerized isobutylene, about 39 per cent cyclized rubber, 2.5 per cent zinc stearate, and a small amount of paraffin wax surrounding said central conductor, and a cylindrically braided conductor tightly surrounding said cylindrical body and having a plurality of individual conductors formed in bunches, there being a predetermined number of such bunches in said braided conductor, the size of said individual conductors and the pitch of such conductors in each of said bunches wound around said dielectric material being such that the number of conductors per bunch is substantially equal to a critical value at which said braided conductor is substantially the equivalent electrically of a solid copper sheet around said cylindrical body.

2. In combination, in a coaxial high frequency transmission line, a central conductor, a cylindrical body surrounding said central conductor, said cylindrical body consisting of 58.2 per cent polymerized isobutylene, 38.8 per cent cyclized rubber, 2.5 per cent zinc stearate, and 0.5 per cent paraffin wax, and a cylindrically braided coaxial conductor tightly surrounding said body and being formed of such a number of bunches of individual conductors and each bunch having such a number of individual conductors of such size that each conductor is wound around said body a minimum number of times per unit length of the transmission line and that there are substantially no electrically effective apertures in said braided coaxial conductor.

3. In a high frequency transmission line, a central conductor, a sulphur-free cylindrical body comprising a mixture of about 58 per cent polymerized isobutylene, about 39 per cent cyclized rubber, 2.5 per cent of a heavy metal salt of a higher fatty acid, and a small amount of paraffin was surrounding said central conductor, and a cylindrically braided conductor tightly surrounding said body and having a plurality of individual conductors formed in bunches, each of said conductors being wound around said body a minimum number of times per unit length of line, each of said bunches having such a number of conductors therein of such size that said braided conductor is substantially the electrical equivalent of a solid conducting sheet.

4. In a high frequency transmission line, a central conductor, a cylindrical body formed of a sulphur-free compound comprising about 58 per cent polymerized isobutylene, about 39 per cent cyclized rubber and a small portion of a heavy metal salt of a higher fatty acid surrounding said central conductor, and a cylindrically braided conductor tightly surrounding said cylindrical body and having a plurality of individual conductors formed in bunches, each of said conductors being wound around said cylindrical body a minimum number of times per unit length of line, each of said bunches having such a number of conductors therein of such size that said braided conductor is substantially the electrical equivalent of a solid conducting tube.

5. In a high frequency transmission line, a central conductor, a cylindrical body surrounding said central conductor, said body being formed of a sulphur-free compound comprising about 58 per cent polymerized isobutylene, about 39 per cent cyclized rubber and a minor portion of a heavy metal salt of a higher fatty acid, and a cylindrically braided coaxial conductor tightly surrounding said cylindrical body and having a plurality of individual conductors formed in bunches, each of said conductors being wound around said body a minimum number of times per unit length of line, each of said bunches having such a number of conductors therein of such size that said braided conductor is substantially the electrical equivalent of a solid conducting tube.

6. In a high frequency transmission line, a central conductor, a cylindrical body of flexible, low-loss, sulphur-free, dielectric material surrounding said central conductor, and a cylindrically braided conductor tightly surrounding said dielectric material and having a plurality of individual conductors formed in bunches, there being a predetermined number of such bunches in said braided conductor, the size of said individual conductors and the pitch of such conductors in each of said bunches wound around said dielectric material being such that the number of conductors per bunch is substantially equal to a critical value at which said braided conductor is substantially the equivalent electrically of a solid copper sheet around said dielectric material.

7. In a high frequency transmission line, a central conductor, a cylindrical body of sulphur-free dielectric material surrounding said central conductor, and a cylindrically braided conductor tightly surrounding said dielectric material and having a plurality of individual conductors formed in bunches, there being a predetermined number of such bunches in said braided conductor, the size of said individual conductors and the pitch of such conductors in said bunches wound around said dielectric material being such that the number of conductors per bunch is substantially equal to a critical value at which said braided conductor is substantially the equivalent electrically of a solid copper sheet around said dielectric material.

8. In combination, in a coaxial high frequency transmission line, a central conductor, a flexible, low-loss, sulphur-free cylindrical body of dielectric surrounding said central conductor, a cylindrically braided coaxial conductor tightly surrounding said dielectric and being formed of such a number of bunches of individual conductors and each bunch having such a number of individual conductors of such size that each conductor is wound around said dielectric a minimum number of times per unit length of the transmission line and that there are substantially no electrically effective apertures in said braided coaxial conductor, and an outer covering of flexible sulphur-free material.

9. In a high frequency transmission line, a central conductor, a flexible, low-loss, sulphur-free dielectric material surrounding said central conductor cylindrically, a cylindrically braided coaxial conductor tightly surrounding said dielectric material and having a plurality of individual conductors formed in bunches, said bunches being braided around said dielectric material, the total number of bunches, the number of conductors per bunch and the size of said conductors being interrelated so that each conductor is wound around said dielectric material a minimum number of times per unit length of said line and so that simultaneously said braid has substantially no electrically effective apertures therethrough when placed tightly around said dielectric material, and an outer covering of flexible, tough, oil-resistant sulphur-free material.

10. In a high frequency transmission line, a central conductor, a cylindrical, sulphur-free dielectric material surrounding said central conductor, and a cylindrically braided coaxial conductor tightly surrounding said dielectric material and having a plurality of individual conductors formed in bunches, each of said conductors being wound around said dielectric material a minimum number of times per unit length of line, each of said bunches having such a number of conductors therein of such size that said braided conductor is substantially the electrical equivalent of a solid conducting tube.

11. In a high frequency transmission line, a central conductor, a cylindrical body of flexible, low-loss, sulphur-free dielectric material surrounding said central conductor, and a cylindrically braided conductor tightly surrounding said dielectric material and having a plurality of individual conductors formed in bunches, each of said conductors being wound around said dielectric body a minimum number of times per unit length of line, each of said bunches having such a number of conductors therein of such size that said braided conductor is substantially the electrical equivalent of a solid conducting sheet.

12. In a high frequency transmission line, a central conductor, a cylindrical body of sulphur-free dielectric material surrounding said central conductor, and a cylindrically braided conductor tightly surrounding said dielectric material and having a plurality of individual conductors formed in bunches, each of said conductors being wound around said dielectric material a minimum number of times per unit length of line, each of said bunches having such a number of conductors therein of such size that said braided conductor is substantially the electrical equivalent of a solid conducting tube.

13. In a high frequency transmission line, a central conductor, a cylindrical body of sulphur-free dielectric material surrounding said central conductor, a cylindrically braided conductor tightly surrounding said dielectric material and having a plurality of individual conductors formed in bunches, each of said conductors being wound around said dielectric material a minimum number of times per unit length of line, each of said bunches having such a number of conductors therein of such size that said braided conductor is substantially the electrical equivalent of a solid conducting tube, and a flexible, tough, oil-resistant cover surrounding said braided conductor.

MOYER M. SAFFORD.